Feb. 26, 1924.
H. E. HAWES
ART OF AERONAUTICS
Filed March 29, 1920   3 Sheets-Sheet 3
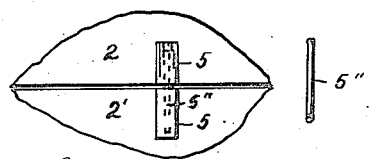
fig. 10.
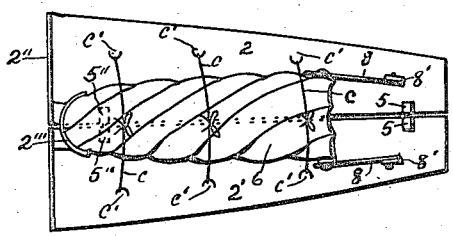
fig. 11
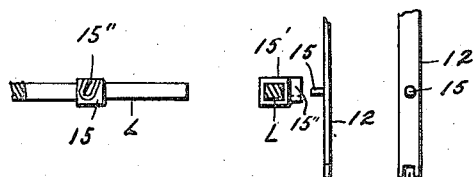
fig. 9
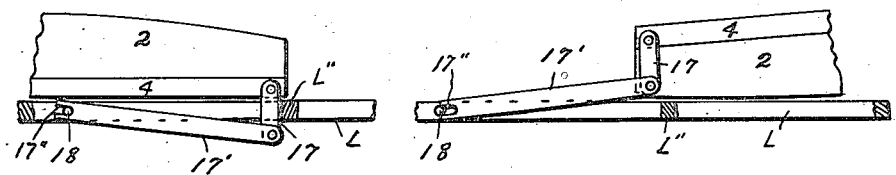
fig. 8.   fig. 8ª
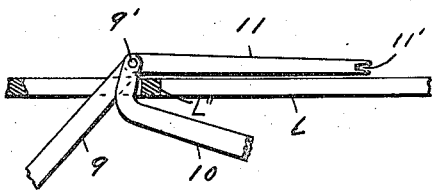
fig. 7.
INVENTOR
Herbert E Hawes Patented Feb. 26, 1924.

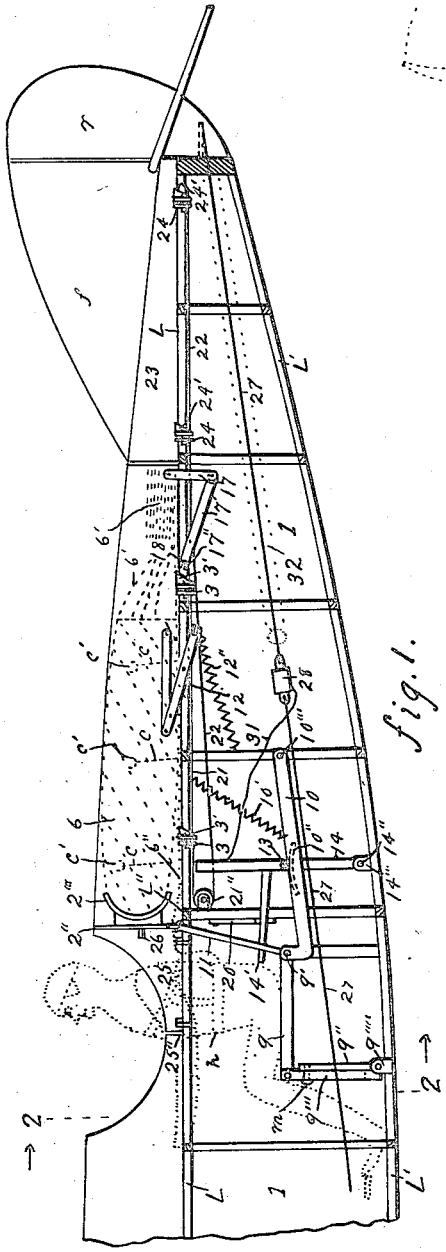
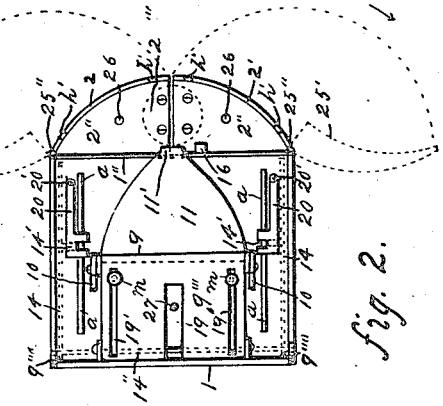
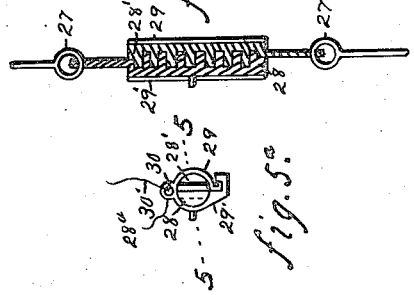
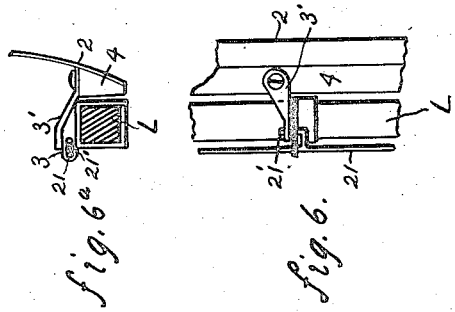

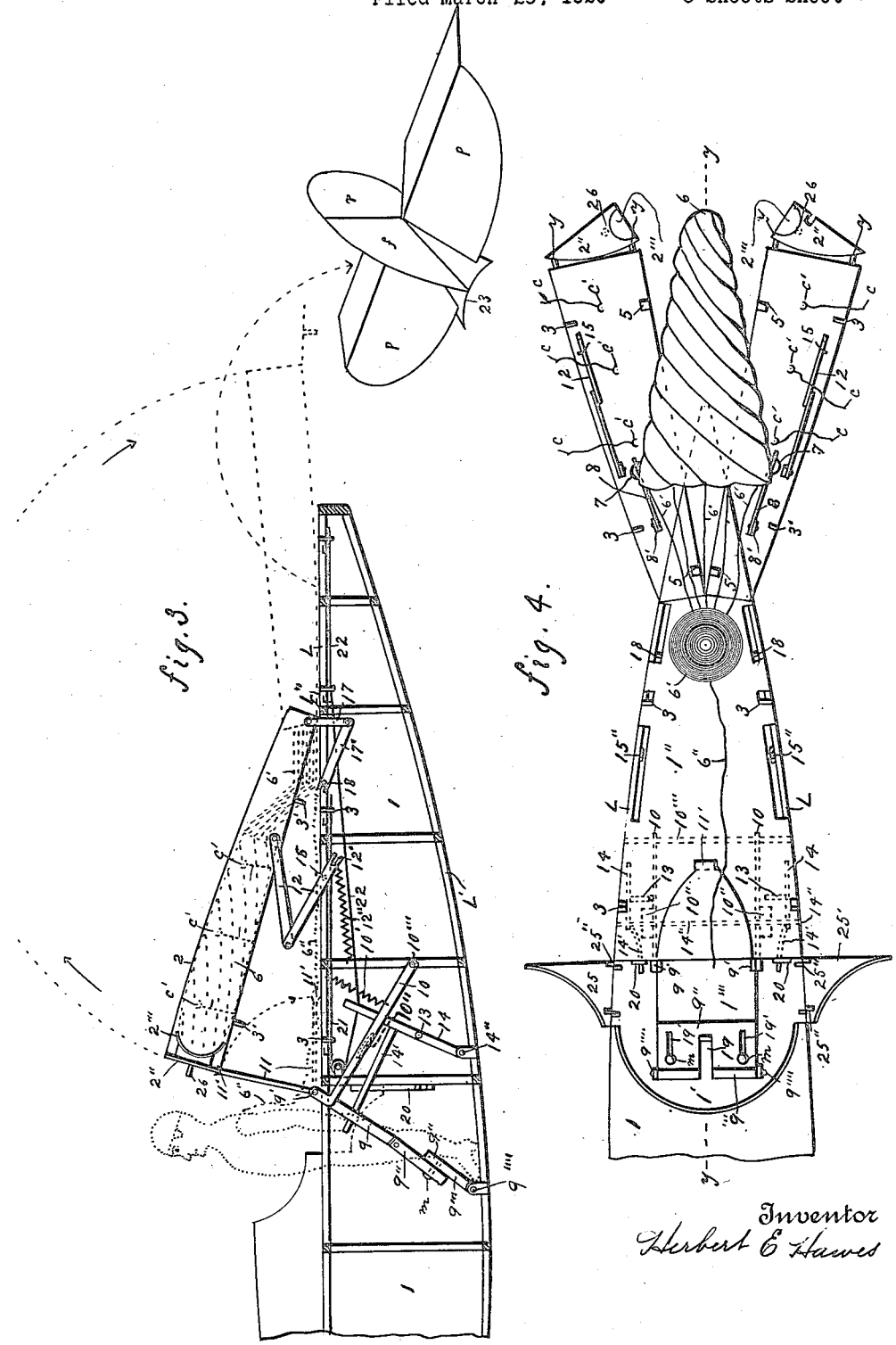

1,484,778

UNITED STATES PATENT OFFICE.

HERBERT E. HAWES, OF BROOKLYN, NEW YORK, ASSIGNOR OF THIRTY ONE-HUNDREDTHS TO WALTER D. EDMONDS, OF BOONVILLE, NEW YORK.

ART OF AERONAUTICS.

Application filed March 29, 1920. Serial No. 369,512.

*To all whom it may concern:*

Be it known that I, HERBERT E. HAWES, a citizen of the United States, and a resident of Brooklyn, in the county of Kings and State of New York, have invented certain new and useful Improvements in the Art of Aeronautics, of which the following is a specification, reference being had to the accompanying drawings, forming a part thereof.

My present invention relates to appliances, in that art, in aid of the aviator's safety and its objects comprise provision of means whereby the aviator may be more immediately, effectively, and with less risk to himself than heretofore, separated from an ascended aircraft by a parachute. To this end my invention comprises provision of accommodations for the parachute, means under manual control of the aviator in aid of creation of conditions whereby it becomes launchable, is automatically progressively expanded and spread, and, simultaneously, operative parts of the aircraft are detached and dropped therefrom to afford clearance for the aviator's body while it is leaving the aircraft under influence of the parachute. These and other novel features of construction and operation of my invention will be apparent in the following description thereof, reference being also had to the accompanying explanatory drawings in which—

Figure 1 is a central, vertical, longitudinal section of the rear part of the fuselage, showing the arrangement of parts, the relation thereto of the aviator, and also of the parachute folded, as indicated in dotted lines.

Figure 2 is a section through line 2—2 of Figure 1 viewed in the direction of the arrows, the presentation of Figure 2 as shown on the sheet being turned 90° from position shown in Figure 1.

Figure 3 is a central vertical longitudinal view, partly in section, and partly in full lines, showing the parachute and its housing uplifting, the seat upfolded and the empennage detached, and falling away from the remainder of the aircraft.

Figure 4 is a plan top view of the fuselage, with the housing reversed, and the parachute spreading.

Figure 5 is, on enlarged scale, a detail view showing my breakable joint for the control-connection in central longitudinal section taken on the line 5—5 of Figure 5ᵃ which latter is an end view of the joint.

Figure 6 is, on enlarged scale, a detail, fragmentary side view showing means for detachably securing the housing to the longéron; and Figure 6ᵃ above it is an end view of the same, the longéron being shown in cross section.

Figure 7 is, also on enlarged scale, a detail, fragmentary side view of my folding joint for the aviator's seat.

Figure 8 is, on the scale of Fig. 7, a detail, fragmentary side view of one of the housing retaining joints and Figure 8ᵃ is a similar view of the joint after its release.

Figure 9 comprises three fragmentary detail views of different presentations of the lower part of the housing uplifting togglelever when it engages the upper longéron socket.

Figure 10 is a detail, diagrammatic view of a joint of my duplex housing.

Figure 11 is a detail view indicating diagrammatically the means whereby the parachute is lightly held to the housing.

In reducing my invention to practice, I provide the fuselage 1, behind the cockpit 1' (Fig. 4), with a removable duplex housing comprising two alike components 2, 2' in place of the streamline-fairing, and extending rearwardly from the cockpit towards the fin 1''', so as to, between them and the fuselage, provide a thereby enclosed cavity, or housing, within which to carry and store the parachute.

Over, and to, the cross braces, or struts, of the fuselage 1, I secure a flooring, of thin plywood or canvas, so as to form a smooth level surface, or table, 1'', free from all obstructions. (Figs. 2 and 4.)

Just forward of the fin I divide the housing into two detachably connected parts, or halves, 2, 2', and hold the same to the fuselage by a series of detachable joints 3, 3' (Figs. 1, 6, 6ᵃ).

The housing 2, 2' I form of thin plywood preferably with a rib 4 on each lower edge thereof and to which is fastened the upper member of the retaining joints 3', the lower member 3 being fast to the longéron L which constitutes as usual one of the longitudinally extending members, or string pieces, with which are permanently combined the other bolted, or otherwise secured together, other members such as the cross-bars L″ to constitute the usual unitary rigid frame of the machine extending continuously, and in operation inseparably, from the propeller to the rudder.

Each half of the housing is provided with two of these joints 3′ on each side, one near each end thereof (Fig. 1).

The upper mutually contacting edges of the two halves of the housing are normally held together by releasable joints, one of which is shown in detail in Fig. 10.

They each consist of a socket 5 screwed to one-half of the housing on the inside, and a similar socket 5′ fastened to the other, abutting, part of the housing, and having an unattached male member or finger 5″ adapted to be loosely worked in and engage with both 5 and 5′ across the line of their junction.

These joints thus pull freely apart after the housing has been detached from the fuselage and reversed as hereafter described.

The folded parachute 6 is held by its string attachments, c, c, over the top of the floor 1″ of the fuselage and beneath the housing 2, 2′ with its top toward the front or cockpit.

On the front end of the housing, I hinge as at h′, h′, (Fig. 2) an end piece or wind shield 2″ in two parts, to cover in the otherwise open end space from beneath the forward edge of the housing, down to the floor 1″ of the thereunder fuselage.

On the inside of the wind shield 2″ I mount a cup-shaped socket 2‴, divided into two parts at the vertical center, to receive and help support the top of the folded parachute. The usual suspensory shroud cords 6′ are coiled aft of the base or bottom of the folded parachute, under the housing (see Figs. 1 and 4), and, leading from said cords, the therewith united suspensory member, or master cord, or strap, 6″, is laid beneath the folded parachute and extends to the cockpit, where it is, as usual, connected with the usual harness, h, secured to the aviator (Fig. 1). These cords and their connection with the harness are, I believe, too well known to require further description.

I uplift the front part of the housing by aid of the back 11 of the aviator's folding bench 9, and the spring-actuated toggle-levers 12 disposed on each side of the fuselage.

The aviator's bench 9 is designed, and so arranged, that upon the release of my housing 2, 2′ from the fuselage, the bench is extendable into a flat surfaced rearwardly inclined plane, or chute, and so disposed as to thereby cover all sharp angles or projections which would otherwise project into the path of the movement of the aviator's body when pulled by the parachute out of the cockpit. This transformation of the bench and thus of the back of the cockpit into a smooth chute for the out-lifted aviator to slide out upon is accomplished under his control, by aid of a pair of spring-actuated raising levers 10, each having an upturned, upwardly movable, end and are pivoted near said end, by a hinge joint 9′ (Fig. 7) to the rear edge of the back member of the bench at each side thereof, and at the other end to a pivot bearing 10‴ located in, and carried by, a relatively stationary element of the fuselage aft of the aviator's seat (Figs. 1 and 3, etc.), the levers extending movably through slotted apertures, a, a, therefor in the back of the cockpit.

These levers 10 are each secured to, and acted upon, by a retractile spiral spring 10′, the upper end of which is attached to an upper longéron L at each side.

These levers, 10, are held in normal position during flight by bolts, or pins, 13, carried by trip-levers 14 pivoted on an oscillatable shaft 14″ journalled in ears 14‴ carried by the lower longéron L′ (Figs. 1, 3, 4). Said bolts engage over the tops of said bench-raising levers 10, at such height as to cause the bottom, or seat proper, 9 of the bench to assume, and retain, its normal horizontal position as in Fig. 1.

In aid of my transformation of the aviator's bench, or seat, into the flat sufaced, rearwardly inclined plane, or chute, above referred to, I, in this instance, substitute for the usual legs, or other vertical support for the front edge of the seat proper, 9, a pair of, relatively to each other slidably reciprocatable, supporting members one of which, 9″, (Figs. 1 and 2) is, near its lower edge, oscillatably mounted on, or hinged or pivoted as at 9⁗, to, relatively stationary studs carried by the fuselage, and carries a pair of therefrom projecting pins m, m, provided with retaining heads as shown. The other one of the aforesaid members 9‴ is pivotally, partially rotatably, connected with the front edge of the seat proper and comprises two mutually parallel slots 19′ within which are slidably disposed the shanks of the pins m, m, which are by their said heads prevented from leaving the slots. The construction is such as to permit of the said members being normally in the positions relatively to each other as indicated in Figure 1 in which case they serve to support the seat; and when the levers 10 are actuated as herein described the construction permits the members to slide relatively to each other and to assume a comparatively extended inclined plane disposition, thus obliterating the angular projection of the front edge of the seat.

Said raising levers 10 each carry, projecting parallel therewith and inwardly towards the center of the fuselage, a relatively short offset shelf 10″ upon which the inner ends of the bolts 13 normally bear to prevent the levers from being raised by the springs 10'.

When the trip levers are moved backwardly, so that the retaining pins 13 clear the rear ends of the laterally extending shelves 10", the levers 10 are free to be acted upon by the springs 10', and thus they swing up or incline all parts of the bench as above described.

The back 11 of the bench is hinged to the seat portion proper on the same axis as the levers 10, and it extends upwardly and is provided adjacent its upper end with a fork 11' (Fig. 2), the aperture of the jaw of which is disposed transversely of the longitudinal axis of the aircraft.

In this fork is held the lower edges of the two part wind shield 2" hinged to the front edge of the housing. It follows that when the bench, including its back, are raised or folded up, into the chute-like form referred to, the back of the seat raises the front part of the housing so that ingress is afforded to the rearwardly flowing airstream and the housing is thereby pried up and its front swung upwardly and backwardly from the aircraft, to reverse the housing.

It follows that the back of the bench when thus raised acts as an inclined cover or shield over the otherwise dangerous angular projection in the aviator's path of the rigid cross tie of the frame of the fuselage; also that owing to the hinged connection of the back with the seat proper, the back will, after being released from the housing by the latter being lifted off of it, fall backwards impelled by the air current into the position shown in Fig. 7 and indicated by dotted lines in Fig. 3.

The uplift and opening of the housing 2, 2' is aided and ensured by the toggle levers 12, the uppermost end of each of which is pivoted to its thereto proximate half of the housing and its lower end detachably pivoted to the longérons.

The lower member of each toggle lever is prolonged and extends beyond its pivotal connection with the longéron to a point below the latter where it is acted upon by a spiral contractile spring 12", one end of which engages releasably with a notch 12' in which the lower end of the lever 12 terminates, and the opposite end of which spring is secured to an upright strut of the fuselage frame in such position that the lever is normally impelled towards its extended position by the contractile stress of the spring.

The lower member, or arm, of each toggle lever 12 is provided medially with an offset pin 15, (see Figs. 3 and 9) which is releasably held in a slot or socket 15" within a member 15' carried by each upper longéron L.

This socket, or slot, is inclined so as to present a rearwardly opening outlet for the pin from which it follows that the raising of the housing past the point where the lever 12 is fully extended, will pull the pin upwardly, and backwardly, from and out of the slot and free the housing, the notch 12' of the lever 12 being at the same time so presented that the spring 12" slips off of it automatically.

This disengaging action takes place on both arms simultaneously to free the housing.

The rear ends of the duplex parts of the housing 2, 2' are held in place each by a lever 17, pivoted thereto, which extends downwardly and bears laterally against the inside of each upper longéron L and transversely against one of the cross bars L" of the longéron (see Fig. 3).

To the lower end of each of said levers, 17, is pivoted one end of a bunt lever 17', its opposite end being formed into a fork 17" engaging on a pin 18 projecting laterally from the upper longéron toward the center of the fuselage, (Fig. 8). When the air pressure has completely raised the housing, it is thereby, and by the levers 12, swung backwardly until its position is completely reversed or upset from the normal, that is, it is now with its narrower end toward the front and its bottom is upward. This reversal causes the levers 17 to be pulled from their normal position inside the fuselage, their lower ends having joined thereto the bunt levers, 17', now being outside and above the upper floor of the fuselage. This allows the forks 17" of the levers to clear the pins 18, and thus completes the freeing of the housing from the fuselage, after which the housing is, by the airstream, swept away from the aircraft thus leaving a completely cleared path above the flooring 1''' of the fuselage for the aviator's parachute-influenced body.

It follows from the above described construction, disposition, and reversal of my duplex housing 2, 2' that it serves to carry, protect, and reverse the parachute which is detachably held thereto, and thereby, in a position and manner such as to be more surely spread, and also more gradually expanded whereby undue shock to the aviator is mitigated or avoided.

The parachute 6 is carried by the said housing until the operation of reversal is accomplished, or nearly so.

The parachute 6 is first packed into a compact bundle as by usual approved methods being folded or twisted into a small parcel (see Fig. 1). It is then laid into the housing, which may be placed on the ground for convenience, the top or apex of the parachute being disposed in the socket 2''' of the wide or front end of the housing.

The parachute is then lightly secured to the housing by small relatively breakable strings or cords c, c (Fig. 3), which serve merely to keep it secured in small space. Said cords are fastened to the inside of the housing and brought around the parachute and tied (Fig. 11).

On the underside of the housing, on each opposite member thereof, is pivoted, on a joint 8', one of two similar arms 8, having their free ends extending toward the front when the housing is in normal closed position; and toward the rear when it has been opened and reversed.

On the bottom, or skirt, 6, of the parachute, on opposite sides thereof, are affixed one of two alike loops 7, through which are inserted the free ends of said arms 8.

These arms serve during the opening and reversal of the housing to expand the bottom of the parachute so as to admit the air-current thereinto and thus ensure the spreading thereof.

The construction as shown is such that the operative ends of the arms, or parachute-spreading members, move divergently from each other during their engagement with the being-released parachute and while the outspreading members (in this instance the halves of the housing) to which the other ends of the arms are secured, are still connected with relatively stationary parts of the aircraft, thereby enabling positive leverage from the aircraft itself as a base, or fulcrum, to be applied in opposite directions towards the opening, or spreading, of the mouth, or bottom, of the parachute as soon as pressure in this instance that derived from the air stream, is exerted upon the parts.

The housing containing the therein tied parachute is now placed upon the floor, 1'', of the fuselage with the shroud cords 6' neatly coiled or folded at the rear (Figs. 1 and 2) and the extension cord 6'' is led forward beneath the parachute to the cockpit (Fig. 4) through an aperture 16 in the wind shield 2'' (Fig. 2), and the aviator-harness, h, is attached thereto.

Locking fingers 21' are carried by rods, or cords, 21, and these fingers are now adjusted into the parts 3—3' of the joint on each side of the housing to hold it in place (Figs. 6 and 1).

The release rods, or cords, 21 (Figs. 6 and 1), for disengaging the housing, extend forward past, and are returned over pulleys 21'' to the trip-levers 14 to which they are fastened near the top thereof in any suitable manner (Fig. 1). It follows that when the levers 14 are oscillated backward the release rods, or cords, aft of the pulley 21'' will be pulled forward and the locking fingers 21' are thereby pulled out of the parts 3—3' of the joints and thus the housing is detached.

To further guard against injury to the aviator while he is being separated from the aircraft by the parachute I provide means, controlled by him, to remove out of his path the empennage comprising its projecting accessories, i. e. fin, f''', rudder, r, stabilizer and elevator planes, p, p, etc.

This empennage, in the present instance, I frame into and rigidly combine with that part of the fairing 23 extending from the rear of the part above described as removably covering the parachute, and in usual form and contour to the rear end of the air craft.

The cross frame-work of the empennage extends through the extreme rear section of fairing 23, and is integral therewith, as is the rudder post and fin members.

This empennage-carrying part of the fairing is, of course, constructed so rigidly and strongly as to resist the strains transmitted from the thereby carried rudder, fin, planes, etc. Figure 1 shows diagrammatically the thus intercombined parts at the moment of their detachment from the aircraft and as falling away therefrom.

This part 23 of the fairing I detachably combine with the longéron L by joints 24—24' similar to those by which the parachute-covering part of the fairing is similarly secured as aforesaid.

The empennage is designed to be swept out of the way by the air current after being released by the aviator. Its joints 24—24' are so placed and arranged as to be unlocked, i. e. their fingers 21' pulled out of their respective sockets 3' (Fig. 6) by release cords, or rods, 22 connected therewith and extending therefrom forward to the trip levers 14 to which they are in turn secured as indicated in Fig. 1.

Thus it will be seen that if the levers 14 be first oscillated forwardly this will release the empennage without as yet disturbing the housing part of the fairing or the aviator's seat, and that after the empennage has been thus detached, rearward oscillation of the lever 14 will operate to release the housing and thus the parachute.

It will be understood that the elements to which I have generally referred as release cords, or rods, are preferably composed of relatively inflexible material throughout that portion thereof which carries the joints, in fact that portion may be so inflexible as to be termed a rod, but the extension from that portion to the levers 14 must have sufficient flexibility to cooperate with the pulleys 21' or to conform to other changes in direction of extension. Such construction seems too obvious to illustrate it more than diagrammatically.

The trip levers 14 are each provided with a forwardly extending handle 14', reaching to beside the aviator's seat in the cockpit.

The trip levers 14 are normally locked against oscillation in either direction by aid of swing catches 20, pivoted as at 20' to the inside of the cockpit (see Fig. 2).

His opening of the catches leaves the handles free to be pressed downwardly by the aviator to cast off the empennage, after which he lifts them up as far as they will go (see Fig. 3), to upfold the seat, etc., and to release the housing in order to free and expand the parachute.

To ensure that the aviator's body shall have an entirely unobstructed path from the aircraft, I longitudinally divide the usual padded rail, or other rear backing or part cover of the cockpit into two parts 25, 25' (see Figs. 2-4) and oscillatably secure each part as by hinges 25'', to its proximate top longeron. To oscillate or swing these parts out of the way they are each respectively engaged by a forwardly projecting pin 26, carried by the wind shield 2'' of the housing, which, as the latter is upraised as before described, results in opening from each other the two parts of the padded rail and causing them to take the positions as shown in Figs. 2 and 4.

The rail, or backing, referred to projects normally, as shown, so as to partially overlap a portion of the area, or interior of the cockpit or station, thus to an extent acting as a cover, or shelter for the aviator, and it therefore normally correspondingly presents a more or less dangerous obstacle, or resistance, in the path of the aviator's body if the latter be pulled backwardly out of the cockpit as by the inflated parachute.

To ensure severance of all connection between the detached empennage and the fuselage, I provide suitable means for example, in this instance, a breakable joint (Figs. 1, 5) in each of the control connections, one of which is exemplified by 27, extending, through an aperture therefor, 19, in the seat members 9'', 9''', from the cockpit to the rudder or to the stabilizer or elevator planes. These joints are so constructed as to be broken or unlocked by the forward oscillation of the trip levers 14.

These breakable joints each comprise cooperating serrated members 28, 28' which mutually interengage and to an end of each of which respectively is fastened an end of the thereby divided control connection 27. The members 28, 28' are held in mutual engagement by a composite openable sleeve surrounding both. The sleeve is made in two semicylindrical parts 29, 29'. On one side of the sleeve the mutually adjacent edges of the parts are shaped so as to detachably interclasp when the sleeve is in normal closed position as indicated in Figure 5ª; on the other side each edge is provided with a plurality of interstaggered ears each containing a bore 30 (Fig. 5ª). These bores mutually register and through them extends, to hold the parts normally together, a withdrawable pin 30' having an eye near one end thereof, through which passes, and is attached to the pin, one end of a release cord 31 which is led forward and its other end attached to lever 14, the forward oscillation or movement of which withdraws the said pin 30' from the ears thereby enabling the sleeve to open, or fall apart, and enables the members 28, 28' to do the same, thereby severing the connection. As the control connections 27 are always under tension, the first forward movement of lever 14 withdraws these pins. The pin-release cords 31 are given enough slack normally to allow of control movements without disturbing the pins.

To facilitate withdrawal from the fuselage of the, as above severed, portion of the control connection adhering to constituents of the empennage, a tubular conduit therefor indicated by dotted lines 32 in Figure 1 is, preferably, carried by constituents of the fuselage.

*Operation.*—It will be observed that the following steps take place in sequence. First the levers 14 are, by the aviator, oscillated, or moved forwardly thereby detaching the empennage and control connections. Secondly the release lever 14 is oscillated or moved rearwardly, thereby folding up the seat, detaching and raising the housing and swinging the cockpit rail out of the way of the aviator. Simultaneously the parachute has been uplifted, reversed, and partially spread, or expanded, being thereby brought into proper disposition to be acted upon by the rearwardly flowing air current, and so initially gradually expanded as to assist in elimination of undue shock to the aviator.

Although any present approved form of parachute may be used, I prefer to employ one embodying the improvement claimed in my Letters Patent No. 1,104,889 of July 28, 1914, that is to say one having a partial fixed cover and a supplementary movable cover adapted to be fully spread after the launching thereof, as this will further contribute to diminish shock. By the use of my present invention the aviator is enabled to, by aid of a parachute, automatically, and relatively safely, launch himself free of the aircraft, and to do this without previously quitting his normal position in the cockpit and with comparatively negligible risk of disastrous collision with elements of the aircraft which are essential to its operation, the advantages of which, in view of existing perilous conditions, seem too obvious for further comment.

Having now described my invention, what I claim as new, and desire to secure by Letters Patent, is the following, viz:

1. In an organized aircraft comprising a thereby detachably carried member projecting outwardly from the fairing of the empennage; means liberatably carried by said aircraft to separate therefrom and suspend independently thereof an occupant of the aircraft; means operable from within the aircraft to liberate therefrom said separating and supporting means; and means similarly operable to simultaneously detach from the aircraft said projecting member to prevent it from colliding with said occupant.

2. In an organized aircraft comprising a cockpit and a posteriorly thereto disposed fin, rudder, stabilizer and elevator planes projecting outwardly from the fairing of the empennage; a parachute liberatably carried by said aircraft to separate therefrom and suspend independently thereof a load thereby carried; means operable from within the aircraft to liberate therefrom said parachute; and means similarly operable to simultaneously detach from the aircraft said fin, rudder, stabilizer and elevator planes to prevent them from colliding with said load.

3. In an aircraft comprising a station for the aviator and abaft of said station a detachably carried member projecting outwardly from the fairing of the empennage, a normally collapsed and covered parachute liberatably carried also abaft of said station; means attaching the parachute to the aviator while in said station; and simultaneously operable by the aviator from the station means to liberate the parachute, means to expand it, and means to detach from the aircraft said projecting member to prevent it from colliding with the aviator.

4. In an organized aircraft a thereby detachably carried member outwardly projecting abaft the aviator transversely of the direction of flight, a normally collapsed parachute liberatably carried by the aircraft abaft of and attached to the aviator in combination with means to liberate the parachute from the aircraft and means to simultaneously detach said projecting member therefrom.

5. An organized aircraft comprising a member detachably carried thereby abaft the aviator and projecting outwardly therefrom transversely of the direction of flight; an openable parachute housing carried by the aircraft intermediate said member and the aviator; means operable by the aviator to open said housing; and means similarly operable to simultaneously detach said member from the aircraft.

6. In an organized aircraft a detachably carried empennage comprising a fin and a rudder, means controllable by the aviator for detaching said empennage from the aircraft, a rudder-controlling connection extending from the rudder to the aviator, and means controllable by the aviator for severing said connection, said last mentioned means comprising a pair of mutually interengaged members, and an openable sleeve normally embracing them.

7. In an organized aircraft a station from which power and direction are controllable by the aviator, a housing for a folded parachute and its cordage normally disposed abaft the station, fastening means to detachably connect the housing with the aircraft, means controllable by the aviator from the station to unfasten said fastening means, and means similarly controllable to uplift a forepart of the housing to ingress thereunder of the airstream.

8. In an organized aircraft a station from which power and direction are controllable by the aviator, a housing for a folded parachute and its cordage normally disposed abaft the station, fastening means to detachably connect the housing with the aircraft, means controllable by the aviator from the station to unfasten said fastening means, means similarly controllable to uplift a forepart of the cover to ingress thereunder of the airstream, and detachable means to meanwhile reversibly connect a rear part of the housing with the aircraft while the forepart is uplifting and reversing.

9. In an organized aircraft a station from which power and direction are controllable by the aviator, a housing for a folded parachute and its cordage normally disposed abaft the station, fastening means to detachably connect the housing with the aircraft, means controllable by the aviator from the station to unfasten said fastening means, means similarly controllable to uplift a forepart of the housing to ingress thereunder of the aircurrent, detachable means to meanwhile reversibly connect a rear part of the housing with the aircraft, and, forward of said last mentioned means, detachable spring actuated means to assist the said uplift and reversal.

10. In an organized aircraft abaft of its cockpit, a parachute-housing its exterior constituting normally a continuation of the fairing, means to detachably connect said housing with the aircraft, means to uplift and reverse the housing, and means controlled by the aviator to detach, uplift and reverse it.

11. In an organized aircraft abaft of the cockpit, a rearwardly longitudinally extended and tapered concave parachute-housing its exterior constituting normally a continuation of the fairing and composed of two longitudinally extending halves or segments having mutually abutting longitudinally extending edges detachably connected, means to detachably connect the lower edges of said segments with the aircraft, and means to uplift a forepart of the housing to ingress thereunder of the air stream, the said means being controllable from the cockpit by the aviator.

12. In an organized aircraft abaft of its cockpit, a longitudinally extended bipartite longitudinally divisible detachable parachute-housing its exterior being in continuation of, flush with, and in conformity with the exterior surface of the fairing, means to detachably connect together the constituent parts of said housing, and, controllable from the cockpit, means to detachably connect the housing with the aircraft, and means to uplift, to spread apart and to reverse the said constituent parts.

13. In an organized aircraft abaft of its cockpit, a longitudinally extended bipartite longitudinally divisible detachable parachute-housing its exterior being in continuation of, flush with, and in conformity with the exterior surface of the fairing, means to detachably connect together the constituent parts of said housing, a parachute spreading member carried by each of said parts, and, controllable from the cockpit, means to detachably connect the housing with the aircraft, and means to uplift, to spread apart and to reverse the said constituent parts.

14. In an organized aircraft abaft of its cockpit, a longitudinally extended bipartite longitudinally divisible detachable parachute-housing its exterior being in continuation of, flush with, and in conformity with the exterior surface of the fairing, means to detachably connect together the constituent parts of said housing, and, swingably carried by each half of the housing adjacent the front edge thereof a therefrom normally vertically depending half of a wind shield dimensioned and disposed to prevent ingress of the airstream underneath the housing, means to detach, means to uplift, means to reverse the housing, and means to, during such uplift, spread apart the halves of the housing.

15. In an organized aircraft abaft of its cockpit, a longitudinally extended bipartite longitudinally divisible detachable parachute-housing its exterior being in continuation of, flush with, and in conformity with the exterior surface of the fairing, means to detachably connect together the constituent parts of said housing, a parachute spreading member carried by each of said parts, and, swingably carried by each half of the housing adjacent the front edge thereof a therefrom normally vertically depending half of a wind shield dimensioned and disposed to prevent ingress of the airstream underneath the housing, means to detach, means to uplift, means to reverse the housing, and means to, during such uplift, spread apart the halves of the housing.

16. In an organized aircraft a cockpit from which power and direction are controllable, an extendable bench comprising a seat proper and a thereto hinged back member for the aviator in said cockpit, and means controlled by the aviator to extend the bench and dispose the seat and back in an inclined plane or chute extending backwardly from in to out of the cockpit.

17. In an organized aircraft a cockpit from which power and direction are controllable, abaft the cockpit a parachute housing detachably connected, with the aircraft, within the cockpit, an extendable bench comprising a seat proper and a thereto hinged back member for the aviator, means controlled by the aviator to detach the housing from the aircraft and means similarly controlled to extend the bench and dispose its seat and back in an inclined plane or chute extending backwardly from in to out of the cockpit, the back member being detachably engaged with a fore part of the housing so that the upraising of the back uplifts said part to ingress thereunder of the airstream.

18. In an organized aircraft, a fuselage comprising a unitary frame extending from the propeller to the rudder; a station from which power and direction are controllable by the aviator; a supplementary empennage detachably attached to the fuselage and comprising a fin, a rudder, and a stabilizer and elevator planes; interlocking means located out of reach of the aviator at said station for so attaching said empennage to the fuselage; a parachute housing longitudinally devisible into two divergently-from-each-other movable parts also detachably attached to the fuselage; interlocking means located out of reach of the aviator at said station for so attaching said parts of the housing; and actuating means within reach of the aviator at said station, and common to said interlocking means, to unlock them and thereby both detach said empennage and enable said parts of the housing to move divergently from each other.

19. In an organized aircraft, a station, or cockpit, from which power and direction are controllable by the aviator; a normally, substantially horizontal, seat member for the aviator in said station; means to movably maintain said seat in its said normal position; a backing comprising two parts each normally overlapping a portion of the cockpit and each outwardly-swingably carried by a relatively stationary part of the aircraft; locking means to releasably maintain said parts of the backing in their said normal positions; means under control of the aviator while in the cockpit to move said seat into an inclined plane extending backwardly away from said station and simultaneously to unlock said locking means whereby the said parts of the backing become swingable outwardly out of the way of the aviator when moving along said inclined plane.

20. In an aircraft, a station, for the aviator, a fuselage comprising a part thereof removably attached and comprising a plurality of detachably interconnected mutually parallel sections each normally constituting a part of the fairing of the fuselage and spreadable relatively to each other in arcs transverse of the central axis of the aircraft; interlocking means located out of reach of the aviator at said station for so attaching said part; and means extending from within reach of the aviator at said station to said interlocking means to unlock them and thereby release from the aircraft said removably attached part.

21. In an aircraft, a station, for the aviator, a fuselage comprising a part thereof removably attached thereto and consisting of a plurality of detachably interconnected mutually parallel sections each normally acting as part of the outside surface or cover of the fuselage and when detached spreadable by aid of the airstream relatively to each other in arcs transverse of the central axis of the aircraft; interlocking means located out of reach of the aviator at said station for so attaching said part of the fuselage; and means extending from within reach of the aviator of said station to said interlocking means to unlock them.

22. In an organized aircraft, a fuselage comprising a unitary frame extending from the propeller to the rudder; a station from which power and direction are controllable by the aviator; a supplementary empennage detachably attached to the fuselage and comprising a rudder; interlocking means located out of reach of the aviator at said station for so attaching said empennage to the fuselage; a parachute housing longitudinally devisible into two divergently-from-each-other movable parts also detachably attached to the fuselage; interlocking means located out of reach of the aviator at said station for so attaching said parts of the housing; and actuating means within reach of the aviator at said station, and common to said interlocking means, to unlock them and thereby both detach said empennage and enable said parts of the housing to move divergently from each other.

23. In an organized aircraft a thereto detachably secured, in parallelism with its central axis longitudinally extending, interiorly concave, housing for a parachute, means under control of the aviator to detach said housing from the aircraft, means to forwardly uplift the housing to ingress thereunder of the airstream, means to assist a reversal backwards of the housing, means to, during such reversal, hold a rear part of the housing to and thereafter release it from the aircraft, and means carried by the housing to, during its reversal, laterally open the parachute to entrance thereinto of the airstream.

24. In an organized aircraft a thereto detachably secured, in parallelism with its central axis longitudinally-extending, interiorly-concave, housing for a parachute, the said housing comprising a plurality of mutually detachably interconnected sections.

25. In an organized aircraft a thereto detachably secured housing or interiorly concave cover for a parachute, means under control of the aviator to detach the housing, means to uplift the forepart of the housing to ingress thereunder of the airstream, and means to detachably hold to the aircraft the rear part of the housing while it is being reversed by aid of the airstream and to, after such reversal, release the housing from the aircraft.

26. In an organized aircraft a thereto detachably secured housing or interiorly concave cover for a parachute, means under control of the aviator to detach the housing, means to uplift the forepart of the housing to ingress thereunder of the airstream, means to detachably hold to the aircraft the rear part of the housing while it is being reversed by aid of the airstream and to, after such reversal, release the housing from the aircraft, and means carried by the housing to during its reversal open the parachute to the airstream.

27. In an organized aircraft comprising a frame, a parachute detachably carried; a pair of independently-of-each-other oppositely movable members detachably pivoted to said frame; means carried by each of said members for positively spreading the parachute; means connecting the parachute with the aviator; and means under control of the aviator to detach the parachute and thereafter the parachute-spreading means from the aircraft.

28. In combination with an organized aircraft comprising a frame, a parachute carried thereby, a station for the aviator, a pair of oppositely outwardly movable parachute-spreading elements each carried by a member pivotally connected with said frame, and means under control of the aviator at said station to permit said members to, when impinged by the air-stream, move upwardly and outwardly in opposite directions.

29. In an organized aircraft, a station for the aviator; a fuselage comprising a supplementary detachable part located aft of said station; a detachable joint for said detachable part located out of reach of the aviator aft of said station; means under the control of the aviator at said station for unlocking said detachable joint to release said detachable part from the fuselage and without detaching the remainder of the fuselage aft of said station; a parachute detachable carried by the aircraft and means under control of the aviator at the station to detach the parachute simultaneously with said unlocking.

30. In an organized aircraft comprising a station for the aviator, a compound fuselage comprising a constituent completely detachable therefrom, openable interlocking means uniting said constituent with the fuselage and located out of reach of the aviator at said station, a parachute detachably carried by said fuselage, means connecting the parachute with the aviator, parachute-spreading means, and means under the control of the aviator at said station to open the said interlocking means, and to set in action the parachute-spreading means.

31. In an organized aircraft, a cockpit for the aviator; an empennage detachably attached to the aircraft and comprising a rudder and rear directional control planes; interlocking means located out of reach of the aviator at the cockpit for so attaching said empennage; a parachute housing releasably attached to the aircraft; interlocking means located out of reach of the aviator at the cockpit for so attaching said housing; and actuating means within reach of the aviator at the cockpit to, in common, open some of said interlocking means to detach the empennage and other of said interlocking means to release the housing.

32. In an organized aircraft, a cockpit for the aviator, a compound fuselage located aft of said cockpit comprising a constituent detachable therefrom, openable interlocking means uniting said constituent with the fuselage and located aft of said cockpit out of reach of the aviator, a detachable parachute carried by said constituent of the fuselage, means connecting the parachute with the aviator, parachute-spreading means pivoted to a constituent of the aircraft, and means within reach, and under the control, of the aviator to open the said interlocking means, to set in action the parachute-spreading means, and to detach the parachute from the aircraft.

33. In an organized aircraft, a cockpit, from which direction is controlled, a universal direction-control member manually operable from within said cockpit, a plurality of direction-control planes detachably carried by said aircraft, a plurality of operating connections for said control planes each comprising a disconnectable joint therein located between each of said planes and said control member, and means for simultaneously detaching said planes from the aircraft and disconnecting said joints.

34. In an organized aircraft, comprising a unitary frame extending from the propeller to the rudder, a fuselage, an empennage detachably mounted on the rear upper end of said frame and fuselage, the said mounting, comprising a plurality of openable retaining joints each comprising a pair of mutually interlockable vertically separable members, means for normally interlocking said pairs, and manually-operable means for simultaneously unlocking them to detach the empennage from the fuselage while leaving the frame intact.

35. In an organized aircraft, a cockpit for the aviator comprising a displaceable back rail, a detachable empennage having mounted thereon the rear control planes, a folding, backwardly-inclinable cross-strut guard located normally in the cockpit, a detachable parachute connected with the aviator, and means under control of the aviator to detach the parachute, to displace the back rail, to detach the empennage, and to incline the guard over the strut.

36. In an organized aircraft, a detachable parachute carried thereby and adapted to be harnessed to the aviator, independent parachute-spreading members located on opposite sides of the longitudinal axis of the plane, and means under control of the aviator to detach the parachute and simultaneously set in action the parachute-spreading members.

37. In an organized aircraft comprising a frame, a cockpit for the aviator; a transverse element of said frame located at the back of the cockpit; a movable guard member disposed normally within the cockpit; and means under control of the aviator for interposing said guard member between himself and said transverse element.

38. In an organized aircraft, a cockpit for the aviator bounded rearwardly by a divisible movable backing having an upwardly presented upmost edge and comprising two alike sections each hinged at one side thereof to an adjacent part of the upper longéron of the aircraft, and means operable by the aviator to swing each of said sections upon its hinges out of his way.

39. In an organized aircraft, a parachute detachably carried thereby, a fuselage, an empennage detachably carried thereby, means operable by the aviator for consecutively detaching the empennage and thereafter the parachute, said means comprising interrelated means movable in one direction for detaching the empennage, and movable in a different direction for detaching the parachute.

40. In an organized aircraft, a fuselage comprising a unitary frame extending from the propeller to the rudder; a station for the aviator; a detachable member projecting aft of said station from the fairline of the fuselage; means, operable from the station, for detaching said member therefrom, without dividing, said frame; a parachute detachably carried by the aircraft; and means also operable from the station for simultaneously detaching said parachute from the aircraft.

41. In an organized aircraft, a fuselage, rear control and stabilizing planes detachably connected therewith; a parachute detachably carried on said fuselage; rear plane detaching means; parachute detaching means; and means operable by the aviator to first actuate the plane detaching means and afterward actuate the parachute detaching means, thereby detaching the planes from, without otherwise impairing the integrity of, said fuselage.

42. In an organized aircraft, a parachute releasably supported thereby under cover from the air stream; a plurality of parachute-spreading members outwardly movable while attached to the aircraft and having relatively free ends normally releasably engageable with opposite sides of the bottom of the parachute; and means controllable by the aviator to abnormally permit the air stream to so outwardly move said spreading means and during their said attachment to the aircraft thereby positively open the bottom of the parachute to passage therethrough of the air stream.

43. In an organized aircraft, a normally collapsed and housed parachute releasably connected therewith and carried and supported against gravity thereby; a plurality of parachute-spreading levers pivotally attached to said aircraft and releasably engaging with the bottom of the parachute while so supported and carried; and means under control of the aviator to enable said spreading means in directions divergent from each other to positively open the bottom of the parachute to the air stream before the parachute's final release from engagement with said levers and cessation of its connection thereby with the aircraft.

44. In an organized aircraft, a collapsed parachute carried thereby; parachute-spreading means operable while movably attached to the aircraft and releasably engaging with said parachute to in a plurality of directions divergent from each other open the bottom of the parachute to entrance thereinto of the air stream; and means controllable by the aviator to enable said spreading means to so operate.

45. In an organized aircraft, a collapsed parachute carried thereby, parachute spreading means outwardly movably releasably carried by the aircraft and releasably engaged with the parachute, and means under control of the aviator to outwardly move said spreading means while they are engaged with the parachute to open it and before their release from the aircraft.

46. In an organized aircraft, a collapsed parachute carried thereby, parachute spreading means outwardly divergently from each other carried by the aircraft and releasably engaged with the parachute, and means under the control of the aviator to outwardly divergently from each other move said spreading means to open the parachute while they are being carried by the aircraft.

47. In an aircraft, a normally housed and collapsed parachute releasably carried thereby and connected to the aviator; a plurality of spreading members therefor normally disposed in parallelism with the air stream, one end of each being detachably hooked to the bottom of the parachute and the other end thereof releasably pivoted to the aircraft and outwardly swingable to spread open the bottom of the parachute to the action of the air stream; and means under control of the aviator to release the parachute and permit said spreading members to spread open the parachute before they are released from the aircraft.

48. In an organized aircraft, a collapsed parachute carried thereby; parachute spreading means carried by the aircraft and releasably engaged with the parachute; and means under control of the aviator to move one of said parachute spreading means in a direction outwardly divergent from the other of said parachute spreading means while said parachute spreading means are being carried by the aircraft.

49. In an organized aircraft having a cockpit, or station, for the aviator, a backing comprising two parts each normally overlapping a portion of the cockpit and each outwardly-swingably carried by a relatively stationary part of the aircraft; locking means to releasably maintain said parts of the backing in their said normal positions; and means under control of the aviator at said station to displace said locking means whereby the said parts of the backing become swingable outwardly out of the way of the aviator.

50. In an organized aircraft having a cockpit, or station, for the aviator, a backing comprising two parts each normally overlapping a portion of the cockpit and each outwardly-swingably carried by a relatively stationary part of the aircraft; locking means to releasably maintain said parts of the backing in their said normal positions; means under control of the aviator at said station to displace said locking means whereby the said parts of the backing become swingable outwardly out of the way of the aviator; and means to swing said parts outwardly from over the cockpit when so released.

51. In an organized aircraft having a cockpit, or station, for the aviator, a backing comprising two parts each normally overlapping a portion of the cockpit and each outwardly-swingably carried by a relatively stationary part of the aircraft; locking means to releasably maintain said parts of the backing in their said normal positions; means under control of the aviator at said station to displace said locking means whereby the said parts of the backing become swingable outwardly out of the way of the aviator; and means to swing said parts outwardly from over the cockpit when so released, said last mentioned means comprising elements movable by pressure of the air stream.

52. In an organized aircraft, a cockpit for the aviator, a normally collapsed parachute harnessed to the aviator and liberatably carried by the aircraft abaft said cockpit; a member, or cover, normally projecting over portions of the cockpit and comprising a plurality of parts each movably carried by the aircraft; locking means for retaining said parts of the cover in their said normal position; means under control of the aviator to in common liberate the parachute and simultaneously release said locking means and remove said cover out of the path of the aviator while taken from the cockpit by aid of the liberated parachute.

53. In an organized airplane, a normally collapsed parachute carried thereby abaft the aviator and connected thereto; releasable parachute retaining means; parachute spreading means comprising a plurality of upwardly and oppositely outwardly spreading levers; spring-pressed means to initially raise both parachute and said spreading levers, and means under control of the aviator to liberate the parachute and simultaneously set in action the parachute-spreading and raising means.

54. In an organized aircraft, a collapsed parachute carried thereby; parachute spreading means upwardly and at the same time oppositely outwardly from each other movably carried by the aircraft and releasably engaged with the parachute; and means, under the control of the aviator, to so upwardly and oppositely outwardly from each other move said spreading means to open the parachute while they are being carried by the aircraft.

HERBERT E. HAWES.

Witness:
WILLIAM J. HOPKINS.